United States Patent
Ito (10) Patent No.: US 12,090,791 B2
(45) Date of Patent: Sep. 17, 2024

(54) PNEUMATIC TIRE

(71) Applicant: Sumitomo Rubber Industries, Ltd., Kobe (JP)

(72) Inventor: Sho Ito, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/939,681

(22) Filed: Sep. 7, 2022

(65) Prior Publication Data

US 2023/0147644 A1    May 11, 2023

(30) Foreign Application Priority Data

Nov. 1, 2021  (JP) ................................. 2021-178905

(51) Int. Cl.
*B60C 11/01*     (2006.01)
*B60C 11/11*     (2006.01)
*B60C 13/02*     (2006.01)

(52) U.S. Cl.
CPC ............... *B60C 11/01* (2013.01); *B60C 11/11* (2013.01); *B60C 13/02* (2013.01)

(58) Field of Classification Search
CPC ....... B60C 11/01; B60C 13/002; B60C 13/02; B60C 13/023; B60C 2011/1338; B60C 2011/0395; B60C 2011/013

(Continued)

(56) References Cited

U.S. PATENT DOCUMENTS

2008/0210355 A1* 9/2008 Harvey .................. B60C 11/01
                                                152/209.8
2010/0180994 A1* 7/2010 Yamaguchi ............ B60C 11/01
                                                152/153

(Continued)

FOREIGN PATENT DOCUMENTS

EP    3 219 516 A1    9/2017
EP    3 332 991 A1    6/2018

(Continued)

OTHER PUBLICATIONS

ESpaceNet Translation of JP-2020093754 (Year: 2023).*
Extended European Search Report for corresponding European Application No. 22188775.5, dated Dec. 19, 2022.

*Primary Examiner* — Robert C Dye
*Assistant Examiner* — Alexander D Booth
(74) *Attorney, Agent, or Firm* — Birch, Stewart, Kolasch & Birch, LLP (57) ABSTRACT

A pneumatic tire includes a tread portion having a first tread edge, and a first buttress portion extending inwardly in a tire radial direction from the first tread edge. The first buttress portion is provided with a plurality of protectors protruding outwardly in a tire axial direction. Each of the plurality of protectors includes a top surface facing outwardly in the tire axial direction, and a side surface extending inwardly in the tire axial direction from an edge of the top surface. The side surface includes an outward-facing portion facing outwardly in the tire radial direction, an inward-facing portion facing inwardly in the tire radial direction, and a circumferential portion facing in a tire circumferential direction. The outward-facing portion, the inward-facing portion and the circumferential portion have different angles with respect to respective normal lines of the top surface from each other.

19 Claims, 9 Drawing Sheets

(58) Field of Classification Search
USPC .......................................... 152/523, 209.16
See application file for complete search history.

(56) References Cited

U.S. PATENT DOCUMENTS

| | | | | |
|---|---|---|---|---|
| 2011/0126950 A1* | 6/2011 | Barton | ..................... | B60C 11/01 |
| | | | | 152/209.11 |
| 2015/0367687 A1* | 12/2015 | Kimura | ................. | B60C 13/001 |
| | | | | 152/523 |
| 2017/0197474 A1* | 7/2017 | Ishigaki | .................. | B60C 13/02 |
| 2018/0022162 A1 | 1/2018 | Takemori | | |
| 2019/0308458 A1* | 10/2019 | Kageyama | .............. | B60C 11/01 |
| 2020/0016940 A1* | 1/2020 | Iwata | ...................... | B60C 13/02 |
| 2020/0055346 A1* | 2/2020 | Murata | .................... | B60C 11/01 |

FOREIGN PATENT DOCUMENTS

| | | | |
|---|---|---|---|
| JP | 2004-291937 A | | 10/2004 |
| JP | 6065033 B2 | | 1/2017 |
| JP | 6443509 B1 | | 12/2018 |
| JP | 2020-93754 A | | 6/2020 |
| JP | 2020093754 A | * | 6/2020 |
| WO | WO 2009/029088 A1 | | 3/2009 |

\* cited by examiner

PNEUMATIC TIRE

RELATED APPLICATIONS

This application claims the benefit of foreign priority to Japanese Patent Application No. JP2021-178905, filed Nov. 1, 2021, which is incorporated by reference in its entirety.

FIELD OF THE DISCLOSURE

The present disclosure relates to a pneumatic tire.

BACKGROUND OF THE DISCLOSURE

Patent Document 1 below discloses a pneumatic tire with a tread portion having a plurality of blocks which is divided by a main groove arranged in the shoulder region of the tread portion and lug grooves reaching the sidewall portion from the main groove. A raised portion formed so as to protrude into one of the lug grooves is provided on the outer side of each block in the tire width direction.

PATENT DOCUMENT

[Patent document 1] Japanese Patent 6065033

SUMMARY OF THE DISCLOSURE

In recent years, it has been required to improve the visibility of protectors and improve the appearance performance of the pneumatic tire while maintaining the traction performance on rough terrain such as muddy road surfaces.

The present disclosure has been made in view of the above circumstances and has a major object to provide a pneumatic tire capable of improving appearance performance while maintaining traction performance.

In one aspect of the present disclosure, a pneumatic tire includes a tread portion having a first tread edge, and a first buttress portion extending inwardly in a tire radial direction from the first tread edge. The first buttress portion is provided with a plurality of protectors protruding outwardly in a tire axial direction. Each of the plurality of protectors includes a top surface facing outwardly in the tire axial direction, and a side surface extending inwardly in the tire axial direction from an edge of the top surface. The side surface includes an outward-facing portion facing outwardly in the tire radial direction, an inward-facing portion facing inwardly in the tire radial direction, and a circumferential portion facing in a tire circumferential direction. The outward-facing portion, the inward-facing portion and the circumferential portion have different angles with respect to respective normal lines of the top surface from each other.

DETAILED DESCRIPTION OF THE DISCLOSURE

Hereinafter, one or more embodiments of the present disclosure will be described with reference to the drawings.

Figure 1:
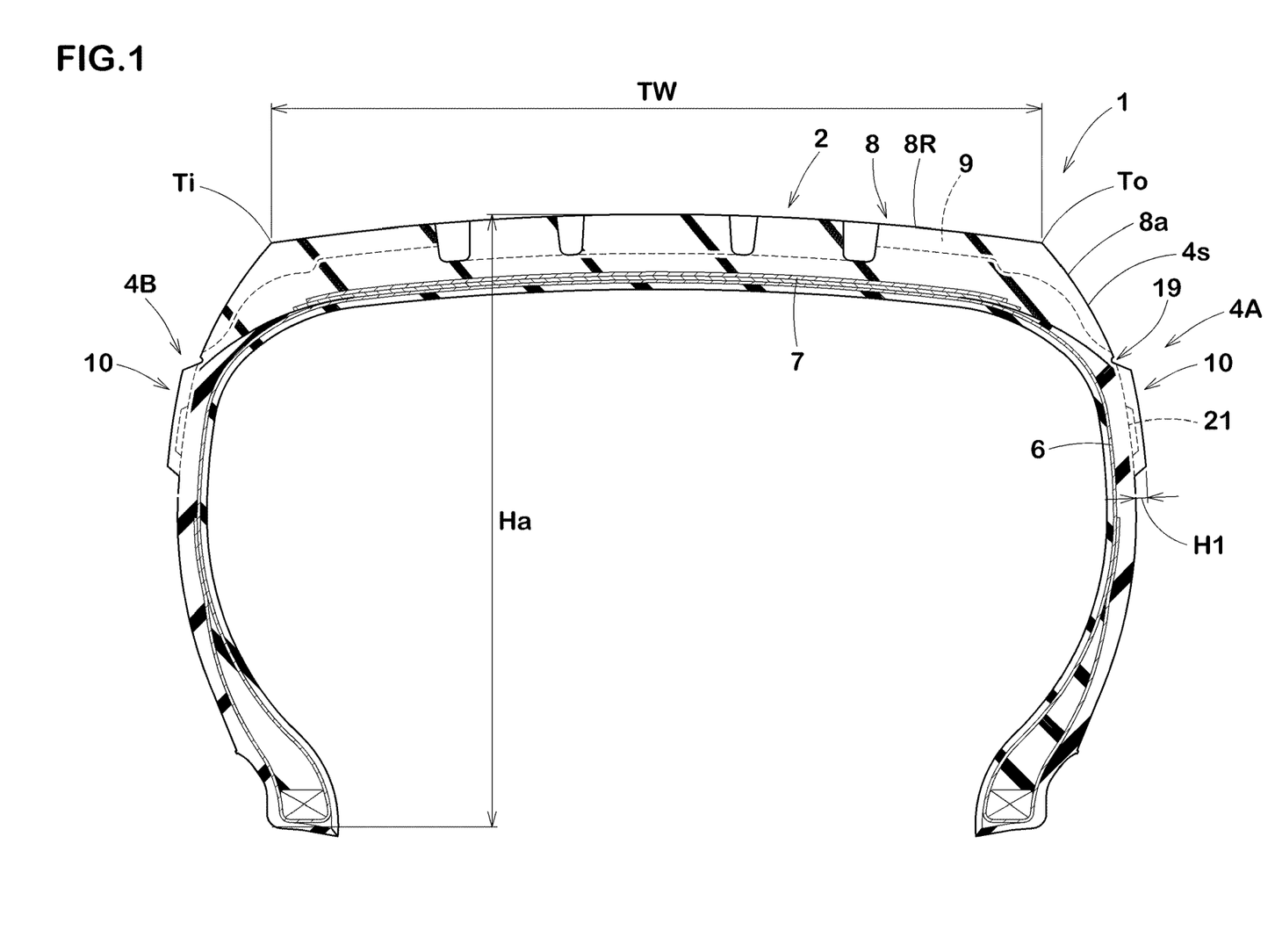
FIG. 1 is a tire meridian cross-sectional view illustrating an embodiment of a pneumatic tire according to the present disclosure.

FIG. 1 is a tire meridian cross-sectional view including the tire axis illustrating an embodiment of a pneumatic tire (hereafter, may be simply referred to as "tire") 1 under a normal state. FIG. 1 illustrates, as a preferred embodiment, a pneumatic tire to be mounted on 4WD vehicles or the like that enable driving on rough terrain. Alternatively, the present disclosure can be applied to tires 1 including those for light trucks and heavy loads.

As used herein, the "normal state" is such that the tire 1 is mounted onto a standard wheel rim (not illustrated) with a standard pressure but loaded with no tire load. As used herein, unless otherwise noted, dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

In the present embodiment, the tire 1 includes some tire components such as a carcass 6, a belt layer and the like. Known members are appropriately adopted for these tire components.

In the present embodiment, the tire 1 includes a tread portion 2 having a first tread edge To, and a first buttress portion 4A extending inwardly in the tire radial direction from the first tread edge To. Further, the tire 1, for example, includes a second tread edge Ti and a second buttress portion 4B extending inwardly in the tire radial direction from the second tread edge Ti. In the present embodiment, the second buttress portion 4B is formed in the same manner as the first buttress portion 4A, so the explanation thereof is omitted herein. Alternatively, the second buttress portion 4B may be formed in a different manner from the first buttress portion 4A.

The first tread edge To and the second tread edge Ti are the axial outermost edges of the ground contacting patch of the tire 1 which occurs under the condition such that the tire 1 under the normal state is grounded on a plane with a standard tire load at zero camber angles. The tread portion 2 is formed between the first tread edge To and the second tread edge Ti. The distance in the tire axial direction between the first tread edge To and the second tread edge Ti is the tread width TW.

As used herein, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example.

Figure 2:
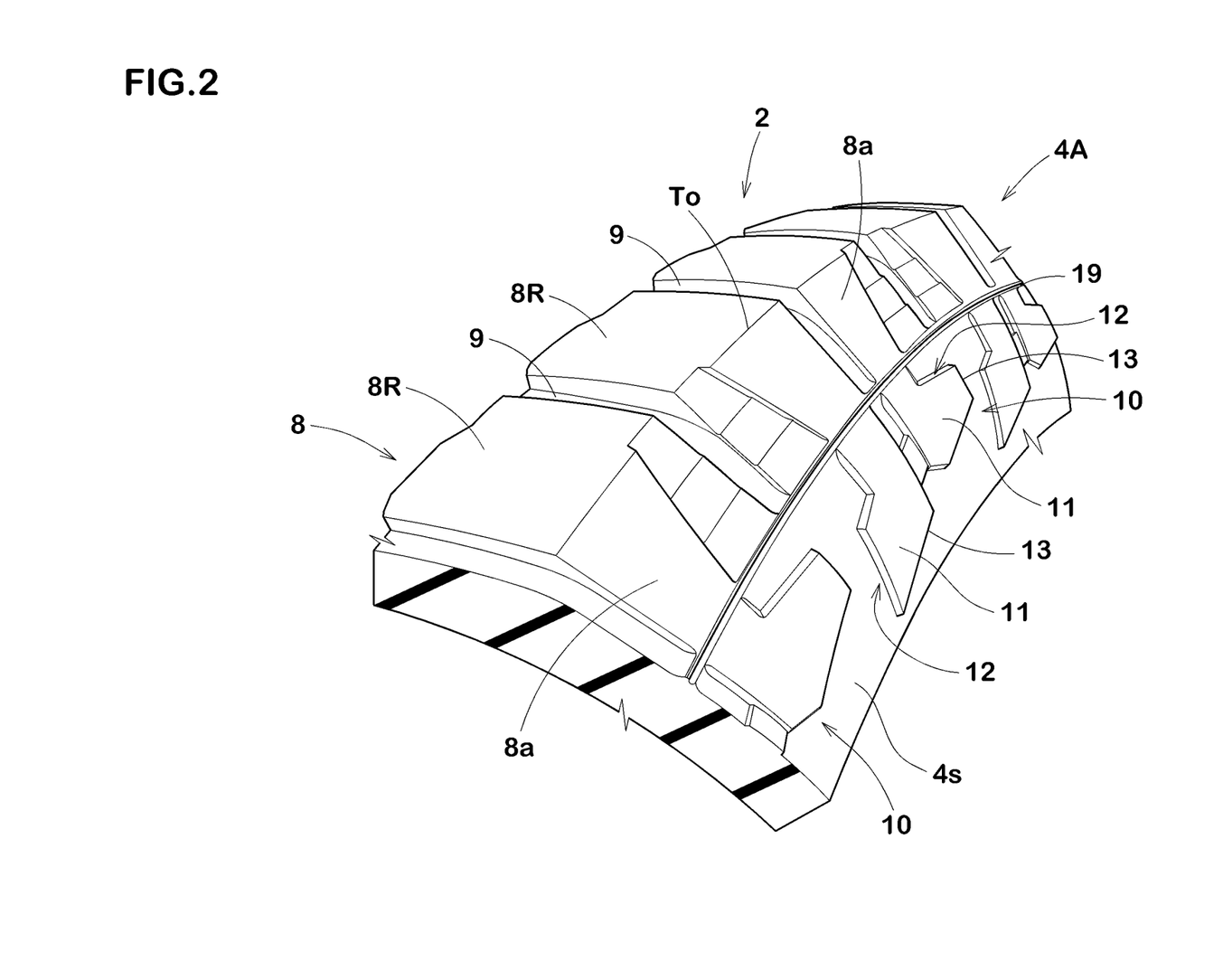
FIG. 2 is a perspective view of a first buttress portion.

FIG. 2 is a perspective view of the first buttress portion 4A. As illustrated in FIG. 2, the first buttress portion 4A according to the present embodiment is provided with a plurality of protectors 10 protruding outwardly in the tire axial direction. The protectors 10 can enhance traction performance by coming into contact with muddy road surface and the like.

Figure 3:
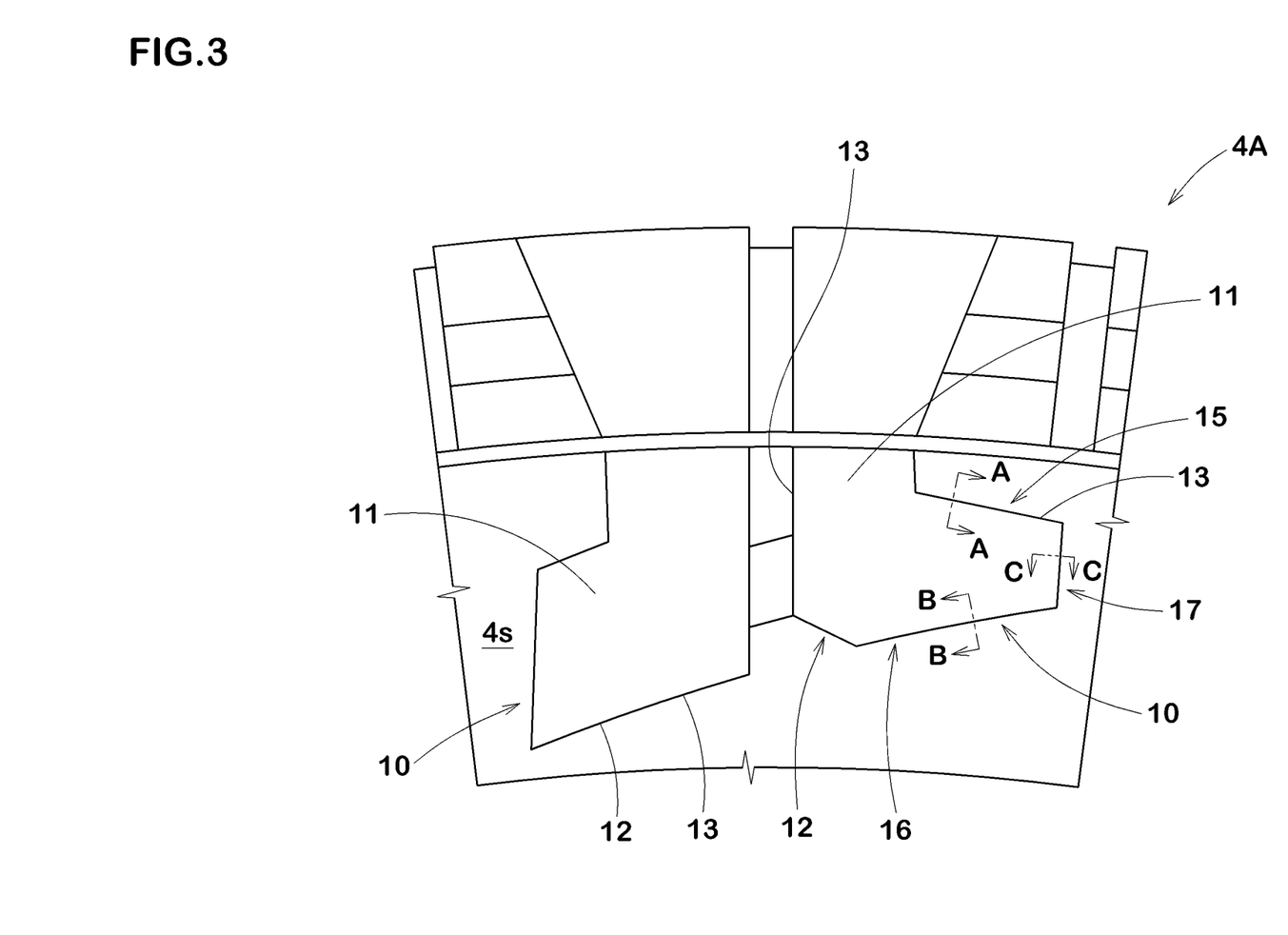
FIG. 3 is a front view of the first buttress portion.

FIG. 3 is a front view of the first buttress portion 4A. As illustrated in FIG. 2 and FIG. 3, each protector 10 includes a top surface 11 facing outwardly in the tire axial direction and a side surface 12 extending inwardly in the tire axial direction from an edge 13 of the top surface 11. The side surface 12, for example, protrudes from an outer surface 4s of the first buttress portion 4A. As used herein, the outer surface 4s means a surface that extends smoothly on the first buttress portion 4A excluding localized unevenness including embossed marks such as marks and uneven patterns in the normal state.

The side surface 12 includes an outward-facing portion 15 facing outwardly in the tire radial direction, an inward-facing portion 16 facing inwardly in the tire radial direction, and a circumferential portion 17 facing in the tire circumferential direction. Note that the shape of protector 10 in a front view of the first buttress portion 4A is not limited to the shape shown in the figure, but various shapes can be adopted.

Figure 4A:
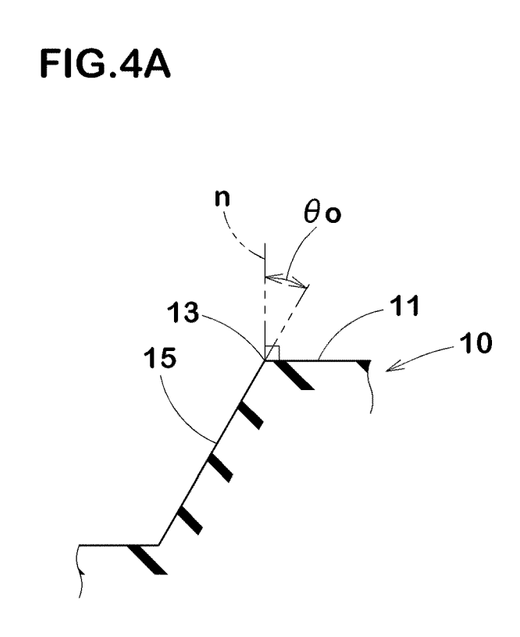
FIG. 4A is a cross-sectional view taken along the line A-A of FIG. 3.
Figure 4B:
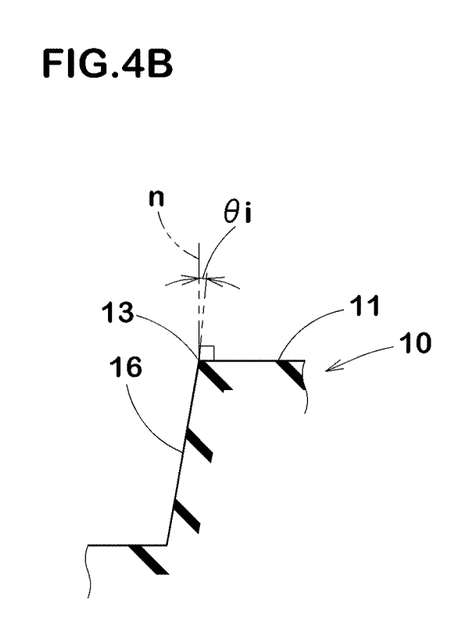
FIG. 4B is a cross-sectional view taken along the line B-B of FIG. 3.
Figure 4C:
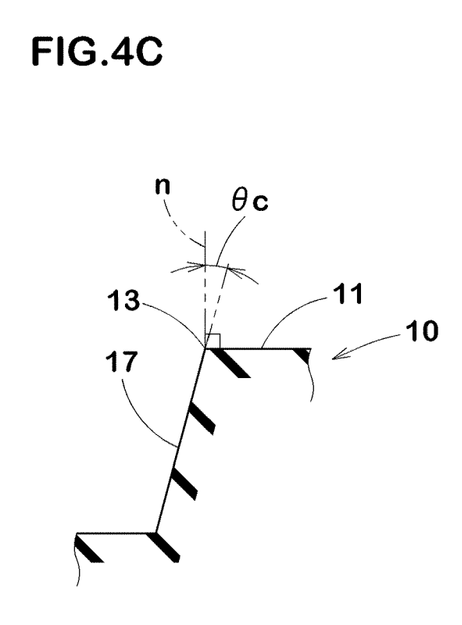
FIG. 4C is a cross-sectional view taken along the line C-C of FIG. 3.

FIG. 4A is a cross-sectional view taken along the line A-A of FIG. 3. FIG. 4A shows a cross section of the outward-facing portion 15 in a direction orthogonal to a longitudinal direction of the outward-facing portion 15. FIG. 4B is a cross-sectional view taken along the line B-B of FIG. 3. FIG. 4B shows a cross section of the inward-facing portion 16 in a direction orthogonal to the longitudinal direction of the inward-facing portion 16. FIG. 4C is a cross-sectional view taken along the line C-C of FIG. 3. FIG. 4C shows a cross section of the circumferential portion 17 in a direction orthogonal to the longitudinal direction of the circumferential portion 17. As illustrated in FIGS. 4A to 4C, the outward-facing portion 15, the inward-facing portion 16 and the circumferential portion 17 have different angles with respect to respective normal lines n of the top surface 11 from each other. Note that the normal lines n pass through the edges 13 in the respective cross-sectional views. As a result, protruding heights of the outward-facing portion 15, the inward-facing portion 16 and the circumferential portion 17 appear to be different from each other. Thus, the visibility of each protector 10 can be improved and the appearance performance can be improved. The outward-facing portion 15 is located outside than the inward-facing portion 16 in the tire radial direction, for example.

The outward-facing portion 15, for example, is inclined inwardly in the tire radial direction toward the outside in the tire axial direction. The inward-facing portion 16, for example, is inclined outwardly in the tire radial direction toward the tire outside in the tire axial direction. The circumferential portion 17, for example, is inclined in a direction close to the center of the top surface 11 in the tire circumferential direction toward the outside in the tire axial direction. In other words, the side surface 12 is inclined outwardly of the top surface 11 toward the inside in the tire axial direction.

Figure 5:
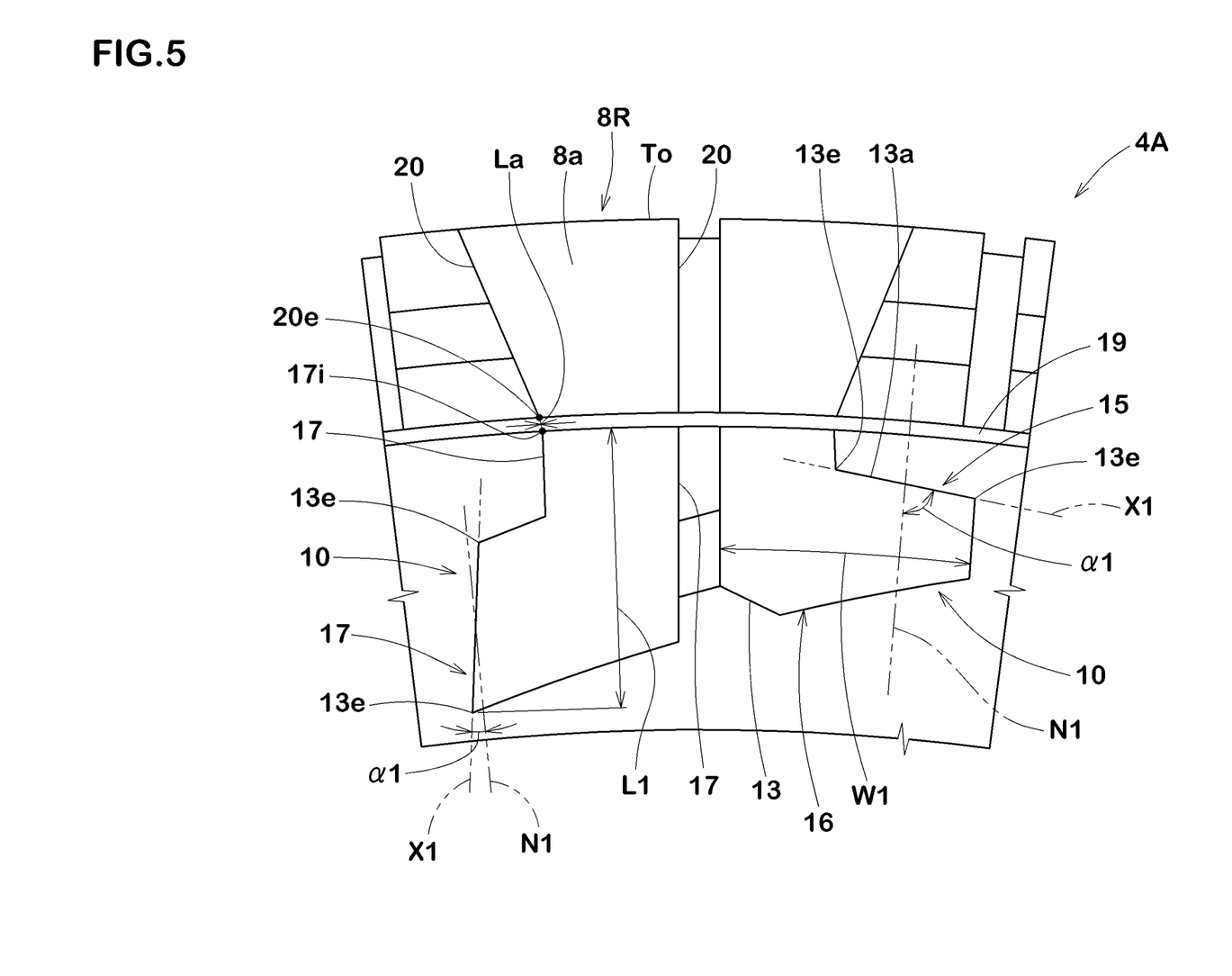
FIG. 5 is a front view of the first buttress portion.

FIG. 5 illustrates a front view of the first buttress portion 4A. As illustrated in FIG. 5, the outward-facing portion 15, the inward-facing portion 16 and the circumferential portion 17 are defined as follows. The outward-facing portion 15 is a portion of the side surface 12 facing outward in the tire radial direction. The outward-facing portion has a straightly extending edge 13a of the edge 13 where the angle $\alpha 1$ between the tire radial line NI passing on a virtual straight line X1 connecting longitudinal ends 13e and 13e of the straightly extending edge 13a and the virtual straightly extending line X1 is greater than 45 degrees. The inward-facing portion 16 is a portion of the side surface 12 facing inward in the tire radial direction. The inward-facing portion 16 has an edge with the above-mentioned angle $\alpha 1$ with respect to the tire radial line NI greater than 45 degrees. The circumferential portion 17 is a portion of the side surface 12 facing the tire circumferential direction. The circumferential portion 17 has an edge with the angle $\alpha 1$ with respect to the tire radial line NI equal to or less than 45 degrees. The angle $\alpha 1$ means the angle of 90 degrees or less of the two divided angles. FIG. 5 shows the outward-facing portion 15 and the circumferential portion 17 as an example.

As illustrated in FIGS. 4B and 4C, an angle $\theta i$ of the inward-facing portion 16 with respect to the normal lines n is preferably smaller than an angle $\theta c$ of the circumferential portion 17 with respect to the normal line n. As illustrated in FIG. 3, in a view where the inward-facing portion 16 is vertically downward, the inward-facing portion 16 is a region where the irradiation of light is relatively small. Thus, by making the angle $\theta i$ of the inward-facing portion 16 smaller than the angle $\theta c$ of the inward portion 17, the shadow of the inward-facing portion 16 can become large. As a result, the difference in the apparent protruding height between the inward-facing portion 16 and the substantially portion 17 becomes clear, and the appearance performance can be improved. In addition, since the angle $\theta c$ of the circumferential portion 17 is larger than the angle $\theta i$ of the inward-facing portion 16, the rigidity of the circumferential portion 17, which receives a large pressure when traveling in muddy ground, can be enhanced, and traction performance and cut resistance can be improved.

When the angle $\theta c$ of the circumferential portion 17 becomes excessively larger than the angle $\theta i$ of the inward-facing portion 16, the circumferential shear force of the circumferential portion 17 on the mud may be reduced. In addition, the angle $\theta i$ of the inward-facing portion 16 becomes excessively small, and the tire mass variation over the tire radial direction of the inward-facing portion 16 becomes large. Thus, the uniformity of the tire may deteriorate and the performance related to noise and vibration (hereinafter referred to as "NV performance") may decrease. When the difference ($\theta c - \theta i$) between the angle $\theta c$ of the circumferential portion 17 and the angle $\theta i$ of the inward-facing portion 16 becomes excessively small, the difference between the apparent protruding heights of the two portions may become small and the appearance performance may deteriorate. From this point of view, the difference ($\theta c - \theta i$) between the angle $\theta c$ of the circumferential portion 17 and the angle $\theta i$ of the inward-facing portion 16 is preferably equal to or more than 10 degrees, more preferably equal to or more than 15 degrees, but preferably equal to or less than 25 degrees, more preferably equal to or less than 20 degrees.

The angle $\theta c$ of the circumferential portion 17 is preferably smaller than the angle $\theta o$ of the outward-facing portion 15 with respect to the normal line n. This can increase the shear force of the circumferential portion 17 against the mud. As illustrated in FIG. 3, in a view where the outward-facing portion 15 is vertically upward, the outward-facing portion 15 is the region where the light irradiation is relatively large. Thus, by making the angle $\theta o$ of the outward-facing portion 15 larger than the angle θc of the circumferential portion 17, the reflection of light at the outward-facing portion 15 becomes larger. Therefore, the outward-facing portion 15 becomes more distinct from the circumferential portion 17 and the inward-facing portion 16 in terms of the apparent protruding height, which can improve the appearance performance. When the angle θo of the outward-facing portion 15 becomes excessively larger than the angle θc of the circumferential portion 17, the vertical shear force of the outward-facing portion 15 may be smaller and the traction performance may decrease. In order to effectively demonstrate such an effect, the difference (θc−θc) between the angle θo of the outward-facing portion 15 and the angle θc of the circumferential portion 17 is preferably equal to or more than 10 degrees, more preferably equal to or more than 15 degrees, but preferably equal to or less than 25 degrees, more preferably equal to or less than 20 degrees.

When the angles θo, θi, and θc of the portions 15 to 17 become large with the area of top surface 11 being unchanged, the tire mass becomes large, and the rubber volume of the protectors 10 become large and the heat generation increases, which may deteriorate the rolling resistance performance. In order to effectively achieve the above-mentioned effects, the angle θi of the inward-facing portion 16 is preferably equal to or more than 0 degrees, more preferably equal to or more than 5 degrees, but preferably equal to or less than 35 degrees, more preferably equal to or less than 25 degrees. Further, the angle θc of the circumferential portion 17 is preferably equal to or more than 5 degrees, more preferably equal to or more than 15 degrees, but preferably equal to or less than 45 degrees, more preferably equal to or less than 35 degrees. Furthermore, the angle θo of the outward-facing portion 15 is preferably equal to or more than 15 degrees, more preferably equal to or more than 25 degrees, but preferably equal to or less than 60 degrees, more preferably equal to or less than 50 degrees. These can improve the appearance performance while maintaining the traction performance. In addition, such a tire 1 has excellent cut resistance performance, rolling resistance performance, and the NV performance, and the increase in tire mass can be suppressed.

As illustrated in FIG. 1 and FIG. 2, the tread portion 2, for example, includes a shoulder land portion 8 forming the first tread edge To. The shoulder land portion 8 according to the present embodiment is divided into a plurality of shoulder blocks 8R by a plurality of shoulder lateral grooves 9 extending so as to traverse the first tread end To in the tire axial direction. The shoulder blocks 8R, for example, include block walls 8a that extend inwardly in the tire radial direction from the first tread edge To. In other words, the block walls 8a form a part of the first buttress portion 4.

The first buttress portion 4A, in the present embodiment, is provided with a groove portion 19 connected to inner edges in the tire radial direction of the block walls 8a and recessed inwardly in the tire axial direction. The groove portion 19, for example, extends continuously in the tire circumferential direction. The groove portion 19 is not limited to such a manner, for example, but it may be formed in a plurality of groove elements in the tire circumferential direction arranged through one or more breaks (not shown). Also, the tire 1 according to the present disclosure is not limited to one including the groove portion 19.

As illustrated in FIG. 5, the block walls 8a of the shoulder blocks 8R, for example, are connected to the respective protectors 10 via the groove portion 19. More specifically, the block walls 8a each include a pair of block edges 20 connecting the first tread edge To and the groove portion 19. In each shoulder block 8R, radial inner ends 20e of the block edges 20 are located in the same positions in the tire circumferential direction as the respective radial outer ends 17i of the circumferential portions 17 connected to the groove portion 19. This can further improve the traction performance due to the shear force generated by the circumferential portions 17 and the block edges 20. The "same position in the tire circumferential direction" means that a separation distance La in the tire circumferential direction between the adjacent inner ends 20e and outer ends 17i is within 5 mm.

The protectors 10, in the present embodiment, have a maximum width WI in the tire circumferential direction equal to or more than 10% of the tread width TW, more preferably equal to or more than 14%, but preferably equal to or less than 25% of the tread width TW, more preferably equal to or less than 20%. The protectors 10, for example, have a maximum length LI in the tire radial direction equal to or more than 12% of the tire section height Ha (shown in FIG. 1), more preferably equal to or more than 16%, but preferably equal to or less than 30% of the tire section height Ha, more preferably equal to or less than 25%. The protectors 10 have a protruding height Hl (shown in FIG. 1) equal to or more than 1.5 mm, more preferably equal to or more than 2.0 mm, but preferably equal to or less than 6.0 mm, more preferably equal to or less than 5.5 mm.

Figure 6:
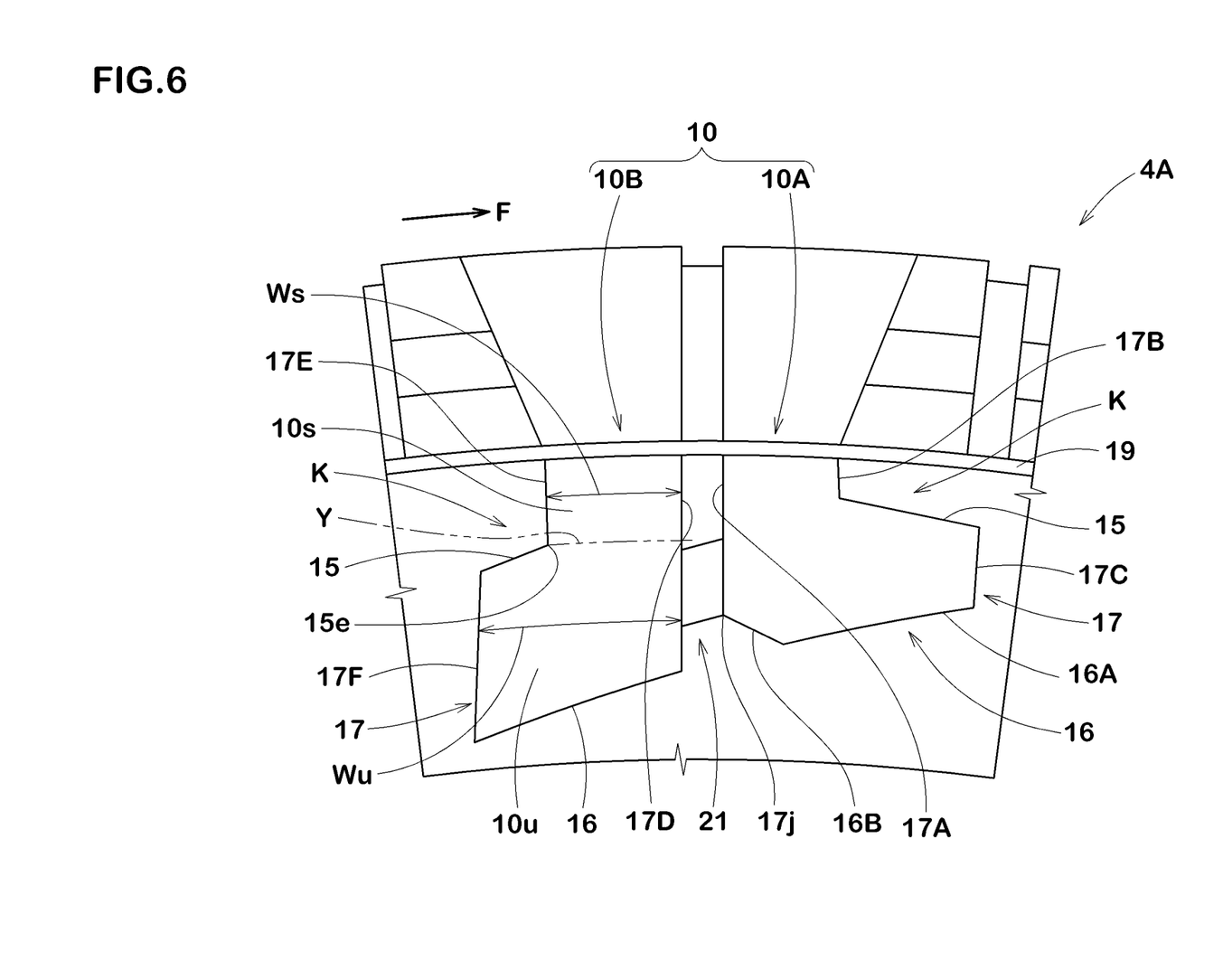
FIG. 6 is a front view of the first buttress portion.

FIG. 6 is a front view of the first buttress portion 4A according to the present embodiment. As illustrated in FIG. 6, each of the protectors 10, for example, includes an outer portion 10s and an inner portion 10u located inwardly of the outer portion 10s in the tire radial direction. The outer portion 10s and the inner portion 10u are virtually demarcated by a circumferential line Y passing through the outer end 15e in the tire radial direction of the outward-facing portion 15. The outer portion 10s is connected to the groove portion 19, in the present embodiment.

The maximum width Ws of the outer portion 10s in the tire circumferential direction is smaller than the maximum width Wu of the inner portion 10u in the tire circumferential direction. This can reduce the tire mass distribution outside the tire radial direction, compared to the case where the maximum width Ws of the outer portion 10s is larger than the maximum width Wu of the inner portion 10u, and can improve the NV performance. These protectors 10 may have excellent appearance performance.

The first buttress portion 4A may have a recess K formed by the inner portion 10u and the outer portion 10s. Such a recess K can increase the shear force in the tire circumferential and radial directions, thus improving the traction performance.

In a front view of the first buttress portion 4A, the protectors 10, in the present embodiment, include L-shaped first protectors 10A protruding in the first tire circumferential direction F and inverted L-shaped second protectors 10B protruding in the opposite direction to the first tire circumferential direction F. A groove extending in the tire radial direction is provided between the respective adjacent first and second protectors.

Each of the first protectors 10A, in the present embodiment, includes a single outward-facing portion 15, two inward-facing portions 16, and three circumferential portions 17. The two inward-facing portions 16 include a first inward-facing portion 16A that is inclined outwardly in the tire radial direction toward the first tire circumferential direction F and a second inward-facing portion 16B inclined inwardly in the tire radial direction toward the first tire circumferential direction F side. The three circumferential portions 17 include a first circumferential portion 17A connecting the groove portion 19 and the second inward-facing portion 16B, a second circumferential portion 17B connecting the groove portion 19 and the outward-facing portion 15, and a third circumferential portion 17C connecting the first inward-facing portion 16A and the outward-facing portion 15. The outward-facing portion 15, in the present embodiment, is inclined inwardly in the tire radial direction toward the first tire circumferential direction F side. Thus, a portion between the outward-facing portion 15 and the first inward-facing portion 16A tapers toward the tire circumferential direction.

Each of the second protectors 10B includes a single outward-facing portion 15, a single inward-facing portion 16, and three circumferential portions 17. The three circumferential portions 17 include a fourth circumferential portion 17D adjacent to the first circumferential portion 17A in the tire circumferential direction, a fifth circumferential portion 17E connecting the groove portion 19 and the outward-facing portion 15, and a sixth circumferential portion 17F connecting the outward-facing portion 15 and the inward-facing portion 16. The outward-facing portion 15 and the inward-facing portion 16, in the present embodiment, are inclined outwardly in the tire radial direction toward the first tire circumferential direction F side.

In addition, the first buttress portion 4A is provided with tie-bars 21 each of which connects a set of one of the first protectors 10A and one of the second protectors 10B which are adjacent in the tire circumferential direction. Each tie-bar 21, in the present embodiment, protrudes outwardly in the tire axial direction with a protruding height which is smaller than that of the protectors 10. Such a tie-bar 21 can enhances the rigidity in the tire circumferential direction of the first protectors 10A and the second protectors 10B to prevent chipping of the protectors 10, thus improving the cut resistance of the first buttress portion 4A. In addition, the tie-bar 21 can suppress the deformation of the first protectors 10A and the second protectors 10B, increase the shear force in the tire circumferential direction, and improve the traction performance.

In the present embodiment, each tie-bar 21 connects the first circumferential portion 17A and the fourth circumferential portion 17D. The tie-bar 21, for example, is connected to an innermost end 17j of the first circumferential portion 17A. Each tie-bar 21 has a circumferentially extending radially outermost edge being inclined outwardly in the tire radial direction toward the first side in the tire circumferential direction, and the outermost edge is located inwardly in the tire radial direction with respect to a radially outermost end of the outward-facing portion 15 of the first protector 10A. Further, the tie-bar 21 has a circumferentially extending radially innermost edge being inclined outwardly in the tire radial direction toward the first side in the tire circumferential direction.

Figure 7:
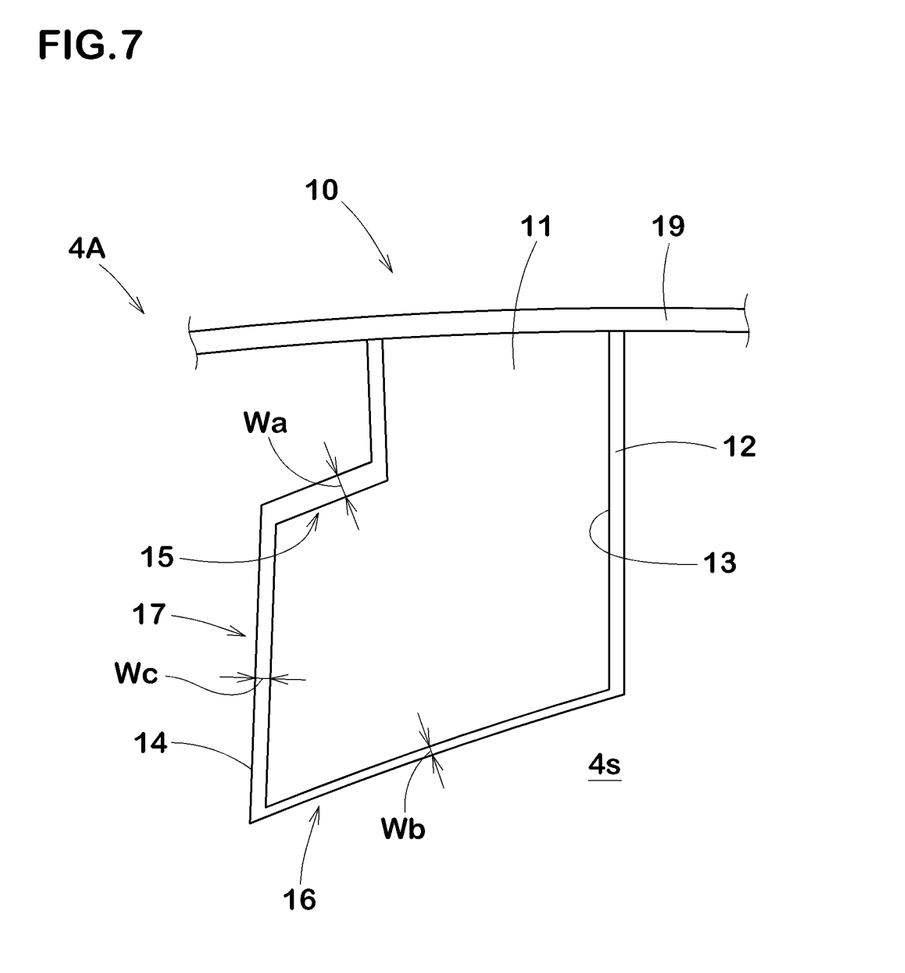
FIG. 7 is a front view of the first buttress portion.

FIG. 7 is a front view of the first buttress portion 4A. FIG. 7 shows the edge 13 of the top surface 11 and an innermost edge 14 of the side surface 12 in the tire axial direction. The edge 13 of the top surface 11 is the outermost edge of the side surface 12 in the tire axial direction. The innermost edge 14 is the boundary between the outer surface 4s and the side surface 12. As illustrated in FIG. 7, a width Wa of the outward-facing portion 15 in a direction orthogonal to the longitudinal direction is preferably greater than a width Wb of the inward-facing portion 16 in a direction orthogonal to the longitudinal direction. As a result, the rigidity of the outward-facing portion 15, which is relatively easy to come into contact with mud, can be increased, and the cut resistance can be improved. In addition, the tire mass of the inward-facing portion 16 which has a relatively small chance of coming into contact with mud can be reduced. Also, when the width Wa of the outward-facing portion 15 and the width Wb of the inward-facing portion 16 are different, the visibility of the protectors 10 can be enhanced.

In order to effectively exert such an action, a width Wc of the circumferential portion 17 orthogonal to the longitudinal direction is preferably different from the width Wa of the outward-facing portion 15. Further, the width Wc of the circumferential portion 17 orthogonal to the longitudinal direction is preferably different from the width Wb of the inward-facing portion 16.

Figure 8:
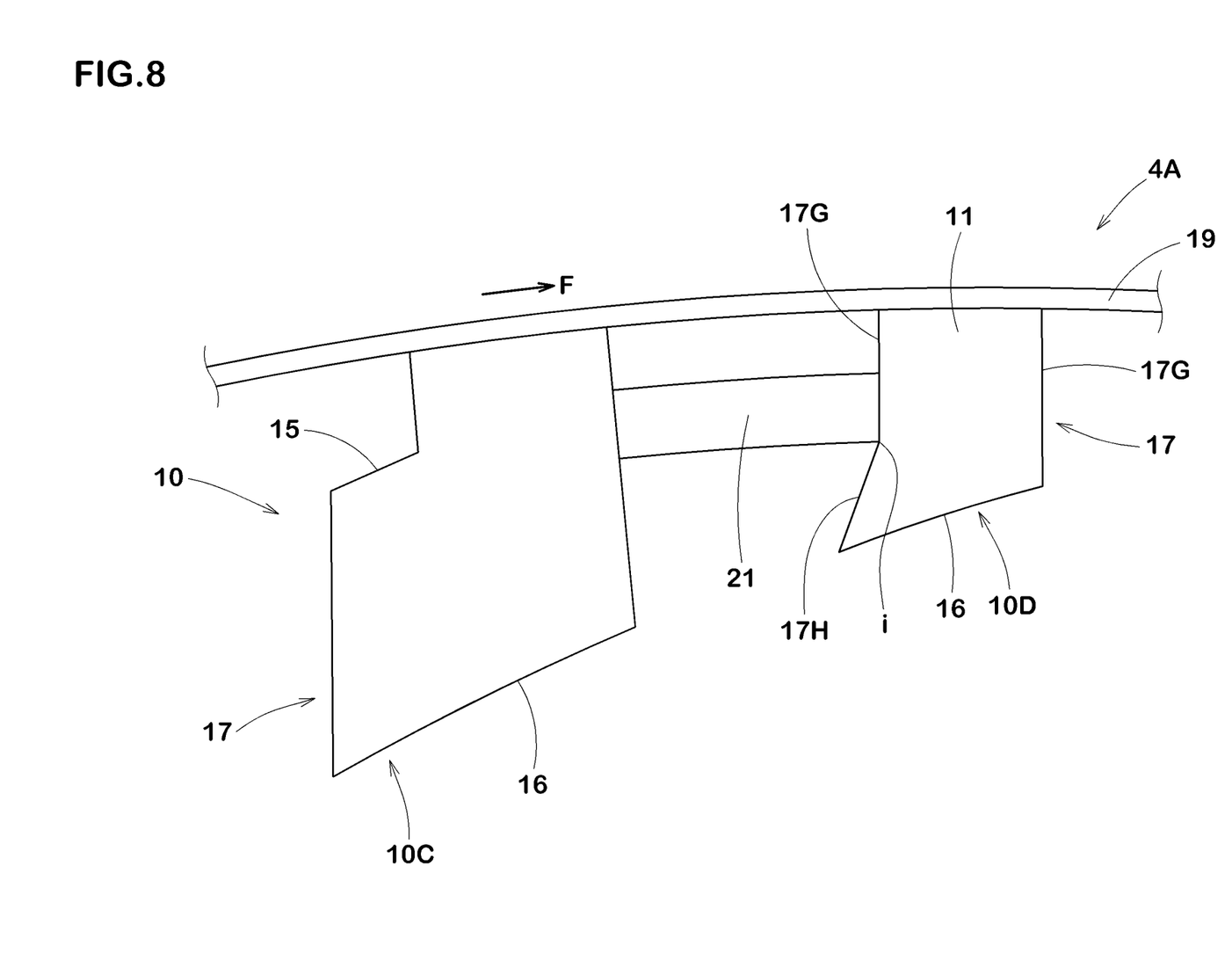
FIG. 8 is a front view of the first buttress portion according to another embodiment.

FIG. 8 illustrates a front view of the first buttress portion 4A in accordance with another embodiment. The same elements as in the first buttress portion 4A as the above-mentioned embodiment may be denoted with the same reference numbers and their description may be omitted. As illustrated in FIG. 8, the first buttress portion 4A according to this embodiment is provided with the protectors 10.

In this embodiment, the protectors 10 include at least one inverted L-shaped third protector 10C protruding in the opposite direction to the first tire circumferential direction F, and at least one inverted L-shaped fourth protectors 10D protruding in the opposite direction to the first tire circumferential direction F and having an area of the top surface 11 smaller than that of the third protector 10C.

The third protector 10C, in this embodiment, includes a single outward-facing portion 15, a single inward-facing portion 16 and three circumferential portions 17, like the second protectors 10B. The fourth protector 10D, in this embodiment, includes a single inward-facing portion 16 and three circumferential portions 17. The three circumferential portions 17 of the fourth protector 10D include a pair of outer circumferential portions 17G and 17G extending from the groove portion 19, and an inner circumferential portion 17H that connects an innermost end i in the tire radial direction of one of the outer circumferential portions 17G adjacent to the third protector 10C and the inward-facing portion 16. The inner circumferential portion 17H, for example, has an angle with respect to the tire radial direction larger than that of the circumferential portions 17G. Even in the fourth protector 10D, the angles θi and θc of the inward-facing portion 16 and the circumferential portions 17, respectively, with respect to the respective normal lines n of the top surface 11 are set as in the above embodiment.

Figure 9A:
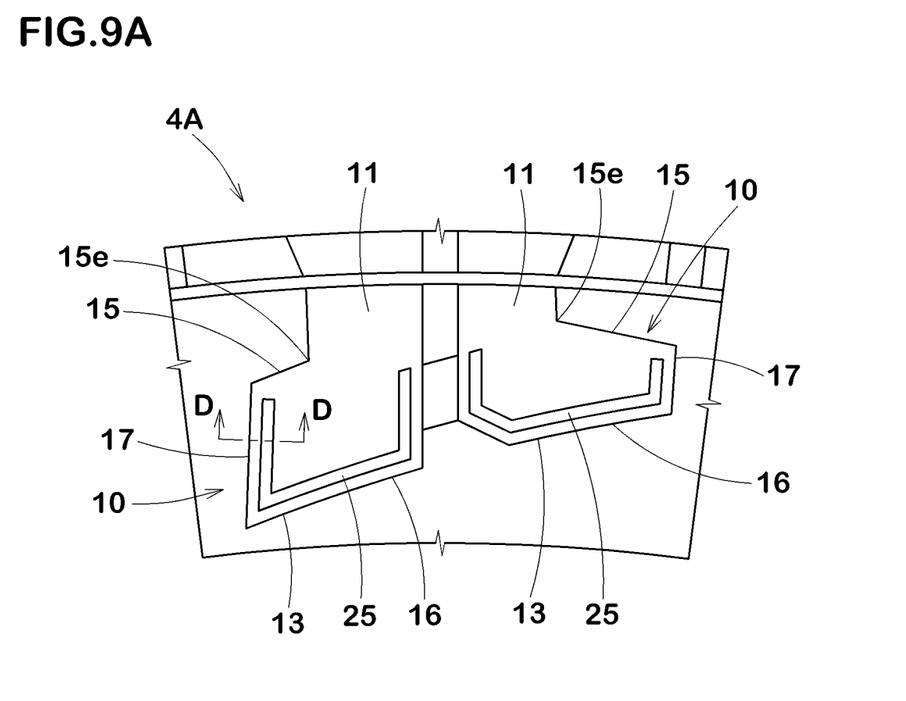
FIG. 9A is a front view of the first buttress portion according to yet another embodiment.
Figure 9B:
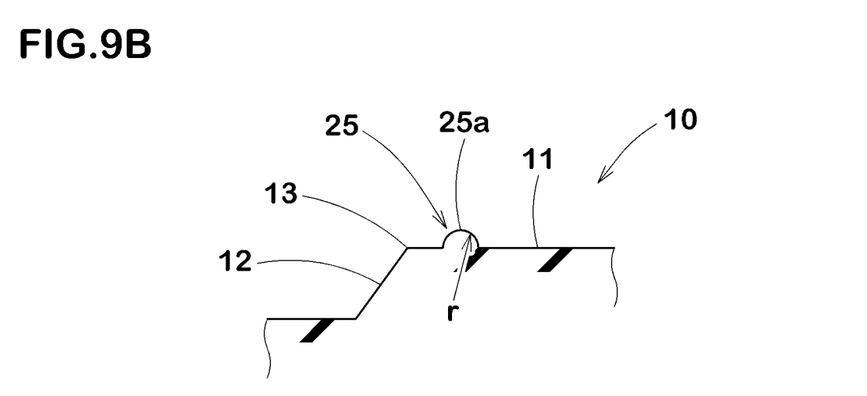
FIG. 9B is a cross-sectional view taken along the line D-D of FIG. 9A.

FIG. 9A is a front view of the first buttress portion 4A according to yet another embodiment. FIG. 9B is a cross-sectional view taken along the line D-D of FIG. 9A. The same elements as in the first buttress portion 4A as the above-mentioned embodiment may be denoted with the same reference numbers and their description may be omitted. As illustrated in FIGS. 9A and 9B, the top surfaces 11 are provided with border portions 25 extending along the edges 13 of the top surfaces 13. The border portions 25, in this embodiment, are located inwardly from the edges 13 of the top surfaces 11. Note that the border portions 25 may be located to include the edges 13 (not illustrated). The border portions 25, for example, are formed as projecting bodies 25a that protrude outwardly in the tire axial direction. Such border portions 25 can give a change in the visibility of the protectors 10 and improve the appearance performance.

The border portions 25, for example, extend along the edges 13 forming the inward-facing portions 16 and the edges 13 forming the inward-facing portions 17. The border portions 25, for example, are arranged on the protectors 10.

In each protector 10, the border portion 25 according to this embodiment is arranged inward in the tire radial direction from the outer end 15e of the outward-facing portion 15.

The projecting bodies 25a each have an arc-shaped cross-section. This can effectively exert the above-mentioned effects. It is preferable that the arc-shaped cross-section of the projecting bodies 25a has a radius of curvature r of from 0.2 to 2 mm.

Although the particularly preferred embodiments of the present disclosure have been described in detail above, the present disclosure is not limited to the embodiments shown in Figures.

Example

Tires having the basic structure shown in FIG. 1 and having the buttress portion shown in FIG. 2 were prepared, and their appearance performance, traction performance, cut resistance, tire mass and NV performance were evaluated. The test methods and common specifications are as follows.

Tire size: 265/70R18
Rim: 18×7.5 J
Internal pressure: 250 kPa

Appearance Performance Test:

Ten test drivers evaluated the beauty and visibility of the first buttress portion sensually. The results are shown in Table 1 scored by the 20-point method with a maximum of 20 points, and are shown by the average score of 10 test drivers. The larger the value, the better the appearance performance.

Traction Performance and NV Performance Test:

Each test tire was mounted on all wheels of a four-wheel drive vehicle with a displacement of 3500 cc. Then, a test driver drove the above vehicle on a test course. As for the traction performance, the driving characteristics related to the smoothness of acceleration when driving on a muddy road surface were evaluated by the sensuality of the test driver. The NV performance was evaluated by the sensuality of the test driver as to the degree of noise generated from the tire when running on dry asphalt. The results are shown in Table 1 by the 20-point method with a maximum of 20 points. The larger the value, the better the traction performance and NV performance.

Cut Resistance Test:

A test driver drove the above vehicle about 1500 km on rocky road surfaces containing rocks and rubble. Then, the cut resistance was evaluated based on the depth of the cut scratches and the length of the cut scratches on the outer surface of the buttress portion. The test results are shown in Table 1 by the 20-point method with a maximum of 20 points. The larger the value, the smaller the cut scratches and the better the cut resistance.

Tire Mass Test:

The mass of the protectors of each test tire was measured. The results are shown in Table 1 as an exponent with the reciprocal of the mass (kg) of Example 1 being 20. The larger the angles $\theta_i$, $\theta_c$, and $\theta_o$, the smaller the area of the top surface and the smaller the tire mass. The larger the value, the smaller the mass and the better. Tires with a small mass have excellent rolling resistance.

The test results are shown in Table 1. The overall evaluation is the total points of each test result. A score of 85 or higher is passed in the overall evaluation.

TABLE 1

|  | Ref. 1 | Ref. 2 | Ref. 3 | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- | --- | --- |
| $\theta_i$ (deg.) | 0 | 15 | 15 | 5 | 45 | 0 | 5 | 5 | 50 | 5 | 5 | 5 |
| $\theta_c$ (deg.) | 0 | 15 | 15 | 15 | 25 | 30 | 50 | 15 | 15 | 15 | 15 | 15 |
| $\theta_o$ (deg.) | 0 | 15 | 15 | 30 | 10 | 60 | 60 | 60 | 30 | 80 | 30 | 30 |
| Border portion(s) | presence | presence | absence | presence | presence | absence | absence | absence | absence | absence | presence | presence |
| r (mm) | 1.0 | 1.0 | — | 1.0 | 1.0 | — | — | — | — | — | 0.1 | 3.0 |
| Ws (mm) | 40 | 70 | 70 | 40 | 40 | 40 | 40 | 40 | 40 | 40 | 70 | 70 |
| Wu (mm) | 80 | 45 | 45 | 80 | 80 | 80 | 80 | 80 | 80 | 80 | 45 | 45 |
| Appearance performance [Score: larger is better.] | 14 | 15 | 14 | 18 | 16 | 18 | 17 | 18 | 16 | 17 | 17 | 17 |
| Traction performance [Score: larger is better.] | 20 | 18 | 18 | 18 | 17 | 17 | 17 | 18 | 17 | 18 | 17 | 18 |
| Cut resistance [Score: larger is better.] | 15 | 16 | 15 | 18 | 18 | 17 | 17 | 16 | 17 | 16 | 17 | 19 |
| Tire mass [Index: larger is better.] | 16 | 18 | 18 | 18 | 17 | 19 | 17 | 17 | 18 |  | 18 | 17 |
| NV performance [Score: larger is better.] | 16 | 15 | 15 | 18 | 17 | 16 | 18 | 17 | 17 | 17 | 16 | 15 |
| Overall evaluation [85 points or higher is passed.] | 81 | 82 | 80 | 90 | 85 | 87 | 86 | 86 | 85 | 86 | 85 | 86 |

As a result of the test, it is confirmed that the tires of the examples can improve cut resistance and mud performance as compared with the tires of the comparative examples. It is also confirmed that the tires of the examples can suppress the increase in tire mass.

[Additional Note]

The present disclosure includes the following aspects.

[Note 1]

A pneumatic tire comprising:
a tread portion having a first tread edge, and
a first buttress portion extending inwardly in a tire radial direction from the first tread edge, wherein
the first buttress portion is provided with a plurality of protectors protruding outwardly in a tire axial direction,
each of the plurality of protectors comprises a top surface facing outwardly in the tire axial direction, and a side surface extending inwardly in the tire axial direction from an edge of the top surface, the side surface comprises an outward-facing portion facing outwardly in the tire radial direction, an inward-facing portion facing inwardly in the tire radial direction, and a circumferential portion facing in a tire circumferential direction, and the outward-facing portion, the inward-facing portion and the circumferential portion have different angles with respect to respective normal lines of the top surface from each other.

[Note 2]

A pneumatic tire comprising:

a tread portion having a first tread edge, and a first buttress portion extending inwardly in a tire radial direction from the first tread edge, wherein the first buttress portion is provided with a plurality of protectors protruding outwardly in a tire axial direction, each of the plurality of protectors comprises a top surface facing outwardly in the tire axial direction, and a side surface extending inwardly in the tire axial direction from an edge of the top surface, the side surface comprises an inward-facing portion facing inwardly in the tire radial direction, and a circumferential portion facing in a tire circumferential direction, and the inward-facing portion and the circumferential portion have different angles with respect to respective normal lines of the top surface from each other.

[Note 3]

The pneumatic tire according to note 1 or 2, wherein an angle θi of the inward-facing portion with respect to the normal line is smaller than an angle θc of the circumferential portion with respect to the normal line.

[Note 4]

The pneumatic tire according to note 3, wherein a difference (θc−θi) between the angle θc of the circumferential portion with respect to the normal line and the angle θi of the inward-facing portion with respect to the normal line is in a range from 10 to 25 degrees.

[Note 5]

The pneumatic tire according to any one of notes 1 to 4, wherein an angle θi of the inward-facing portion with respect to the normal line is equal to or less than 35 degrees, and an angle θc of the circumferential portion with respect to the normal line is in a range from 5 to 45 degrees.

[Note 6]

The pneumatic tire according to note 1, wherein an angle θc of the circumferential portion with respect to the normal line is smaller than an angle θo of the outward-facing portion with respect to the normal line.

[Note 7]

The pneumatic tire according to note 6, wherein a difference (θo−θc) between the angle θo of the outward-facing portion with respect to the normal line and the angle θc of the circumferential portion with respect to the normal line is in a range from 10 to 25 degrees.

[Note 8]

The pneumatic tire according to note 6 or 7, wherein the angle θo of the outward-facing portion with respect to the normal line is in a range from 15 to 60 degrees.

[Note 9]

The pneumatic tire according to any one of notes 1 to 8, wherein each of the plurality of protectors comprises an outer portion and an inner portion located inwardly in the tire radial direction of the outer portion, and a maximum length in a tire circumferential direction of the outer portion is smaller than a maximum length in the tire circumferential direction of the inner portion.

[Note 10]

The pneumatic tire according to any one of notes 1 to 9, wherein the top surface is provided with a border portion extending along the edge of the top surface.

[Note 11]

The pneumatic tire according to note 10, wherein the border portion extends along an edge part forming the inward-facing portion and an edge part forming the circumferential portion.

[Note 12]

The pneumatic tire according to note 10 or 11, wherein the border portion has a projecting body protruding outwardly in the tire axial direction.

[Note 13]

The pneumatic tire according to note 12, wherein the projecting body, in a cross-sectional view thereof, has an arc-shaped surface having a radius of curvature of from 0.2 to 2 mm.

The invention claimed is:

1. A pneumatic tire comprising:

a tread portion having a first tread edge, and a first buttress portion extending inwardly in a tire radial direction from the first tread edge, wherein the first buttress portion is provided with a plurality of protectors protruding outwardly in a tire axial direction, each of the plurality of protectors comprises a top surface facing outwardly in the tire axial direction, and a side surface extending inwardly in the tire axial direction from an edge of the top surface, the side surface comprises an outward-facing portion facing outwardly in the tire radial direction, an inward-facing portion facing inwardly in the tire radial direction, and a circumferential portion facing in a tire circumferential direction, the outward-facing portion, the inward-facing portion and the circumferential portion have different angles with respect to respective normal lines of the top surface from each other, the plurality of protectors comprises at least one first protector having an L-shape protruding towards a first side in the tire circumferential direction and a second protector being spaced from and adjacent to the at least one first protector on a second side in the tire circumferential direction to form a groove extending in the tire radial direction between the at least one first protector and the second protector, the groove is provided with a localized tie-bar connecting the at least one first protector and the second protector with a protruding height smaller than those of the at least one first protector and the second protector, the at least one first protector includes a single outward-facing portion, and two inward-facing portions, the two inward-facing portions include a first inward-facing portion that is inclined outwardly in the tire radial direction toward the first side in the tire circumferential direction and a second inward-facing portion inclined inwardly in the tire radial direction toward the first side in the tire circumferential direction, the second protector has an inverted L-shape protruding towards the second side in the tire circumferential direction, the tie-bar has a circumferentially extending radially outermost edge being inclined outwardly in the tire radial direction toward the first side in the tire circumferential direction, the outermost edge is located inwardly in the tire radial direction with respect to a radially outermost end of the outward-facing portion of the at least one first protector, each of the plurality of protectors comprises an outer portion and an inner portion located inwardly in the tire radial direction of the outer portion, and a maximum length in the tire circumferential direction of the outer portion is smaller than a maximum length in the tire circumferential direction of the inner portion.

2. A pneumatic tire comprising:

a tread portion having a first tread edge, and a first buttress portion extending inwardly in a tire radial direction from the first tread edge, wherein the first buttress portion is provided with a plurality of protectors protruding outwardly in a tire axial direction, each of the plurality of protectors comprises a top surface facing outwardly in the tire axial direction, and a side surface extending inwardly in the tire axial direction from an edge of the top surface, the side surface comprises an inward-facing portion facing inwardly in the tire radial direction, and a circumferential portion facing in a tire circumferential direction, the inward-facing portion and the circumferential portion have different angles with respect to respective normal lines of the top surface from each other, the plurality of protectors comprises at least one first protector having an L-shape protruding towards a first side in the tire circumferential direction and a second protector being spaced from and adjacent to the at least one first protector on a second side in the tire circumferential direction to form a groove extending in the tire radial direction between the at least one first protector and the second protector, the groove is provided with a localized tie-bar connecting the at least one first protector and the second protector with a protruding height smaller than those of the at least one first protector and the second protector, the at least one first protector includes a single outward-facing portion, and two inward-facing portions, the two inward-facing portions include a first inward-facing portion that is inclined outwardly in the tire radial direction toward the first side in the tire circumferential direction and a second inward-facing portion inclined inwardly in the tire radial direction toward the first side in the tire circumferential direction, the second protector has an inverted L-shape protruding towards the second side in the tire circumferential direction, the tie-bar has a circumferentially extending radially outermost edge being inclined outwardly in the tire radial direction toward the first side in the tire circumferential direction, the outermost edge is located inwardly in the tire radial direction with respect to a radially outermost end of the outward-facing portion of the at least one first protector, each of the plurality of protectors comprises an outer portion and an inner portion located inwardly in the tire radial direction of the outer portion, and a maximum length in the tire circumferential direction of the outer portion is smaller than a maximum length in the tire circumferential direction of the inner portion.

3. The pneumatic tire according to claim 1, wherein an angle θi of the first and second inward-facing portions with respect to the normal line is smaller than an angle θc of the circumferential portion with respect to the normal line.

4. The pneumatic tire according to claim 3, wherein a difference (θc−θi) between the angle θc of the circumferential portion with respect to the normal line and the angle θi of the first and second inward-facing portions with respect to the normal line is in a range from 10 to 25 degrees.

5. The pneumatic tire according to claim 1, wherein
an angle θi of the first and second inward-facing portions with respect to the normal line is equal to or less than 35 degrees, and
an angle θc of the circumferential portion with respect to the normal line is in a range from 5 to 45 degrees.

6. The pneumatic tire according to claim 1, wherein an angle θc of the circumferential portion with respect to the normal line is smaller than an angle θo of the outward-facing portion with respect to the normal line.

7. The pneumatic tire according to claim 6, wherein a difference (θo−θc) between the angle θo of the outward-facing portion with respect to the normal line and the angle θc of the circumferential portion with respect to the normal line is in a range from 10 to 25 degrees.

8. The pneumatic tire according to claim 6, wherein the angle θo of the outward-facing portion with respect to the normal line is in a range from 15 to 60 degrees.

9. The pneumatic tire according to claim 1, wherein the top surface is provided with a border portion extending along the edge of the top surface.

10. The pneumatic tire according to claim 9, wherein the border portion extends along an edge part forming the inward-facing portion and an edge part forming the circumferential portion.

11. The pneumatic tire according to claim 9, wherein the border portion has a projecting body protruding outwardly in the tire axial direction.

12. The pneumatic tire according to claim 11, wherein the projecting body, in a cross-sectional view thereof, consists of a semi arc-shaped surface having a radius of curvature of from 0.2 to 2 mm.

13. The pneumatic tire according to claim 1, wherein
the single outward-facing portion is inclined inwardly in the tire radial direction toward the tire circumferential direction, and
a portion between the single outward-facing portion and the first inward-facing portion of the at least one first protector tapers toward the tire circumferential direction.

14. The pneumatic tire according to claim 1, wherein a length of the second inward-facing portion is shorter than a length of the first inward-facing portion.

15. The pneumatic tire according to claim 1, wherein a length of the first inward-facing portion is longer than a length of the single outward-facing portion.

16. The pneumatic tire according to claim 1, wherein the tie-bar has a circumferentially extending radially innermost edge being inclined outwardly in the tire radial direction toward the first side in the tire circumferential direction.

17. The pneumatic tire according to claim 2, wherein the tie-bar has a circumferentially extending radially innermost edge being inclined outwardly in the tire radial direction toward the first side in the tire circumferential direction.

18. The pneumatic tire according to claim 1, wherein
the groove is provided with only a single localized tie-bar connecting the at least one first protector and the second protector with a protruding height smaller than those of the at least one first protector and the second protector,
the second protector includes a circumferential portion adjacent to the at least one first protector in the tire circumferential direction,
the circumferential portion adjacent to the at least one first protector in the tire circumferential direction extends radially inwardly from a radially outermost end of the second protector along the tire radial direction in a straight manner over an entire length thereof and
one end in the tire circumferential direction of the tie-bar is connected to the circumferential portion adjacent to the at least one first protector in the tire circumferential direction.

19. A pneumatic tire comprising:
a tread portion having a first tread edge, and
a first buttress portion extending inwardly in a tire radial direction from the first tread edge, wherein
the first buttress portion is provided with a plurality of protectors protruding outwardly in a tire axial direction,
each of the plurality of protectors comprises a top surface facing outwardly in the tire axial direction, and a side surface extending inwardly in the tire axial direction from an edge of the top surface,
the side surface comprises an inward-facing portion facing inwardly in the tire radial direction, and a circumferential portion facing in a tire circumferential direction,
the inward-facing portion and the circumferential portion have different angles with respect to respective normal lines of the top surface from each other,
the plurality of protectors comprises at least one first protector having an L-shape protruding towards a first side in the tire circumferential direction and a second protector being spaced from and adjacent to the at least one first protector on a second side in the tire circumferential direction to form a groove extending in the tire radial direction between the at least one first protector and the second protector,
the groove is provided with only a single localized tie-bar connecting the at least one first protector and the second protector with a protruding height smaller than those of the at least one first protector and the second protector,
the at least one first protector includes a single outward-facing portion, and two inward-facing portions,
the two inward-facing portions include a first inward-facing portion that is inclined outwardly in the tire radial direction toward the first side in the tire circumferential direction and a second inward-facing portion inclined inwardly in the tire radial direction toward the first side in the tire circumferential direction,
the second protector has an inverted L-shape protruding towards the second side in the tire circumferential direction,
the second protector includes a circumferential portion adjacent to the at least one first protector in the tire circumferential direction,
the tie-bar has a circumferentially extending radially outermost edge being inclined outwardly in the tire radial direction toward the first side in the tire circumferential direction,
the outermost edge is located inwardly in the tire radial direction with respect to a radially outermost end of the outward-facing portion of the at least one first protector,
the circumferential portion adjacent to the at least one first protector in the tire circumferential direction extends radially inwardly from a radially outermost end of the second protector along the tire radial direction in a straight manner over an entire length thereof, and
one end in the tire circumferential direction of the tie-bar is connected to the circumferential portion adjacent to the at least one first protector in the tire circumferential direction.

* * * * *